(12) United States Patent
Kataoka

(10) Patent No.: US 11,704,348 B2
(45) Date of Patent: Jul. 18, 2023

(54) SEARCH RESULT OUTPUT METHOD, SEARCH RESULT OUTPUT METHOD, AND NON-TRANSITORY COMPUTER-READABLE STORAGE MEDIUM FOR STORING PROGRAM

(71) Applicant: FUJITSU LIMITED, Kawasaki (JP)

(72) Inventor: Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 943 days.

(21) Appl. No.: 16/228,880

(22) Filed: Dec. 21, 2018

(65) Prior Publication Data

US 2019/0205326 A1 Jul. 4, 2019

(30) Foreign Application Priority Data

Jan. 4, 2018 (JP) .................................. 2018-000328

(51) Int. Cl.
 *G06F 16/33* (2019.01)
 *G06F 16/9038* (2019.01)
 *G06F 16/31* (2019.01)
 *G06F 16/903* (2019.01)
 *G06F 16/36* (2019.01)

(52) U.S. Cl.
 CPC ........ *G06F 16/3334* (2019.01); *G06F 16/319* (2019.01); *G06F 16/334* (2019.01); *G06F 16/374* (2019.01); *G06F 16/9038* (2019.01); *G06F 16/90344* (2019.01)

(58) Field of Classification Search
 CPC .. G06F 16/3334; G06F 16/319; G06F 16/334; G06F 16/374; G06F 16/90344; G06F 16/9038

USPC .......................... 707/722, 726, 741, 742, 769
See application file for complete search history.

(56) References Cited

U.S. PATENT DOCUMENTS

| | | | | |
|---|---|---|---|---|
| 6,226,635 B1 * | 5/2001 | Katariya | ............ | G06F 16/2457 707/999.004 |
| 7,953,740 B1 * | 5/2011 | Vadon | .................... | G06F 16/337 707/751 |
| 9,251,180 B2 * | 2/2016 | Deshpande | ............. | G06F 16/33 |
| 9,852,189 B1 * | 12/2017 | Mengle | ................. | G06F 16/955 |
| 10,929,883 B1 * | 2/2021 | Zhou | ................... | G06F 16/9537 |
| 2001/0044758 A1 * | 11/2001 | Talib | ...................... | G06Q 10/10 705/26.1 |

(Continued)

FOREIGN PATENT DOCUMENTS

| | | |
|---|---|---|
| JP | 09-185634 | 7/1997 |
| JP | 11-306203 | 11/1999 |

*Primary Examiner* — Phong H Nguyen

(74) *Attorney, Agent, or Firm* — Xsensus LLP

(57) ABSTRACT

A method for outputting a search result includes: executing a reception process that includes receiving a search query for target data; executing a candidate item identification process that includes referring to index information associating each of a plurality of items included in the target data with a position of a corresponding one of the items, and identifying a first storage area configured to store an item corresponding to a keyword included in the search query; and executing an addition process that includes when a description included in the corresponding one of the items includes a reference to a different item, referring to the index information, and adding information on a second storage area configured to store the different item to the reference to the different item.

9 Claims, 11 Drawing Sheets

(56) References Cited

U.S. PATENT DOCUMENTS

| | | | | |
|---|---|---|---|---|
| 2005/0283464 | A1* | 12/2005 | Allsup | G06F 16/9535 |
| | | | | 705/14.54 |
| 2006/0294085 | A1* | 12/2006 | Rose | G06F 16/313 |
| | | | | 707/E17.084 |
| 2007/0143311 | A1* | 6/2007 | Uppala | G06F 16/2471 |
| | | | | 707/999.1 |
| 2007/0174296 | A1* | 7/2007 | Gibbs | G06F 16/27 |
| | | | | 707/999.01 |
| 2007/0198500 | A1* | 8/2007 | Lucovsky | G06Q 30/0251 |
| | | | | 707/999.004 |
| 2007/0288431 | A1* | 12/2007 | Reitter | G06F 16/951 |
| | | | | 707/999.003 |
| 2008/0098024 | A1* | 4/2008 | Kataoka | G06F 16/90335 |
| | | | | 707/E17.14 |
| 2008/0140679 | A1* | 6/2008 | Deyo | G06F 16/9558 |
| | | | | 707/999.1 |
| 2009/0093244 | A1* | 4/2009 | Kataoka | G06F 21/10 |
| | | | | 455/418 |
| 2009/0287685 | A1* | 11/2009 | Charnock | G06F 16/38 |
| | | | | 707/999.005 |
| 2010/0169343 | A1* | 7/2010 | Kenedy | G06F 16/951 |
| | | | | 707/758 |
| 2014/0201179 | A1* | 7/2014 | Chang | G06F 18/00 |
| | | | | 707/706 |
| 2015/0356072 | A1* | 12/2015 | He | G06F 40/237 |
| | | | | 704/9 |
| 2016/0260131 | A1* | 9/2016 | Wai | G06F 16/245 |
| 2017/0300519 | A1* | 10/2017 | López | G06F 16/26 |

\* cited by examiner

FIG. 5

(a) RESTORE A BITMAP OF <a name = " ">

<a name=" ">

| 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|---|
| 0 0 0 0 | 0 0 0 0 | 0 0 0 0 | 0 0 0 0 | 0 0 0 0 | 0 0 0 0 | 0 0 0 0 | 0 1 0 0 | 0 0 0 0 |

(b) RESTORE A BITMAP OF birth(ANCHOR NAME)

birth(ANCHOR NAME)

| 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|---|
| 0 0 0 0 | 0 0 0 0 | 0 0 0 0 | 0 0 0 0 | 0 0 0 0 | 0 0 0 0 | 0 0 0 0 | 0 1 0 0 | 0 0 0 0 |

(c) NARROW DOWN

| 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|---|
| 0 0 0 0 | 0 0 0 0 | 0 0 0 0 | 0 0 0 0 | 0 0 0 0 | 0 0 0 0 | 0 0 0 0 | 0 1 0 0 | 0 0 0 0 |

(d) RESTORE A BITMAP OF </a>

</a>

| 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|---|
| 0 0 0 0 | 0 0 0 0 | 1 0 0 0 | 0 0 0 0 | 0 0 0 0 | 0 0 0 0 | 0 0 0 0 | 0 1 0 0 | 0 0 0 0 |

(e) SELECT A BITMAP OF THE NEAREST </a>

</a>

| 35 34 33 32 | 31 30 29 28 | 27 26 25 24 | 23 22 21 20 | 19 18 17 16 | 15 14 13 12 | 11 10 9 8 | 7 6 5 4 | 3 2 1 0 |
|---|---|---|---|---|---|---|---|---|
| 0 0 0 0 | 0 0 0 0 | 1 0 0 0 | 0 0 0 0 | 0 0 0 0 | 0 0 0 0 | 0 0 0 0 | 0 1 0 0 | 0 0 0 0 |

SEARCH RESULT OUTPUT METHOD, SEARCH RESULT OUTPUT METHOD, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-328, filed on Jan. 4, 2018, the entire contents of which are incorporated herein by reference.

FIELD

The embodiments discussed herein are related to a search result output method, a search result output apparatus, and a non-transitory computer-readable storage medium for storing a program.

BACKGROUND

A technique is known in which for each item, which includes a character or a word, in dictionary content, or the like, index information with offset that indicates the position of the character or the word is generated, and the information is used for a search. In such a technique, index information with offset is referenced, and a file that stores an item extracted from a search query is identified.

A related-art technique is disclosed in Japanese Laid-open Patent Publication No. 11-306203.

SUMMARY

According to an aspect of the embodiments, a method for outputting a search result includes: executing a reception process that includes receiving a search query for target data; executing a candidate item identification process that includes referring to index information associating each of a plurality of items included in the target data with a position of a corresponding one of the items, and identifying a first storage area configured to store an item corresponding to a keyword included in the search query; and executing an addition process that includes when a description included in the corresponding one of the items includes a reference to a different item, referring to the index information, and adding information on a second storage area configured to store the different item to the reference to the different item.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of narrowing-down processing of a reference destination according to the embodiment;

DESCRIPTION OF EMBODIMENTS

However, in the above-described technique, edit data are created that include only files in which items extracted from a search query are stored. Accordingly, when a terminal having a limited capacity is permitted to browse a search result, a link to the other item referenced in the description of the extracted item is sometimes broken. Because a file that stores the other item is not included in the edit data produced by combining only the items extracted from the search query.

According to an aspect of the embodiments, it is desirable to provide a search result output program, or the like capable of suppressing a broken link to the other item referenced in the description of the extracted item.

Hereinafter a detailed description will be given of a search result output program, a search result output device, and a search result output method according to embodiments of the present disclosure with reference to the drawings. The embodiments will not limit the scope of rights.

Embodiment

Search Result Output Processing According to Embodiment

Figure 1:
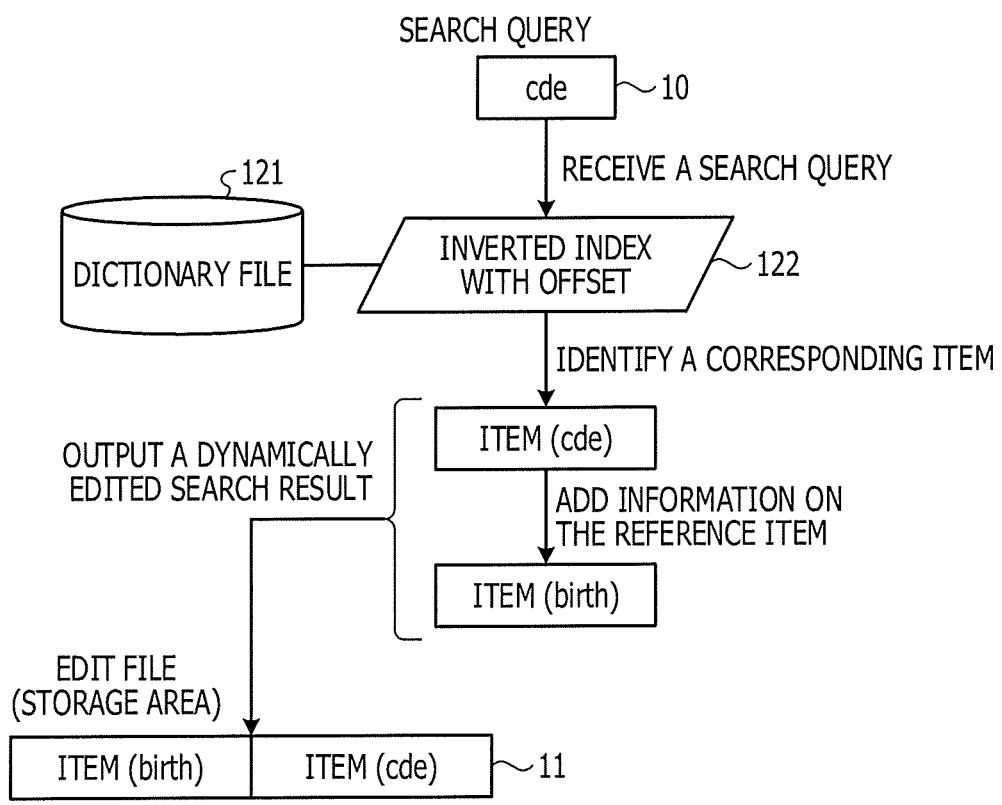
FIG. 1 is an explanatory diagram illustrating search result output processing according to an embodiment.

A description will be given of search result output processing by an information processing apparatus 100 (refer to FIG. 2) according to an embodiment with reference to FIG. 1. FIG. 1 is an explanatory diagram illustrating the search result output processing according to the embodiment. As illustrated in FIG. 1, when a search query 10 is, for example, a keyword "cde", the information processing apparatus 100 receives the keyword "cde", which is the search query 10. Next, the information processing apparatus 100 refers to an inverted index with offset 122, which is the index information that indicates the position of a character or a word in each item in a dictionary file 121 including a large number of items, and identifies an item (cde) corresponding to the keyword "cde", which is the search query 10. In FIG. 1, the expression "item (heading)" indicates an item corresponding to the heading in parentheses. For example, "item (cde)" represents an item corresponding to the keyword "cde". The detailed descriptions will be given later of the dictionary file 121 and the inverted index with offset 122.

The information processing apparatus 100 adds the information on the other item referenced in the description of the identified item (cde) to the search result. In the example in FIG. 1, when an item (birth) is referenced in the description of the identified item (cde), the information on such an item (birth) is added to the search result. Next, the information processing apparatus 100 dynamically edits the item (cde) identified from the keyword "cde", which is the search query 10, and the item (birth) referenced in the description of the item (cde) from a large number of items included in the dictionary file 121, and outputs the dynamically edited search result as an edit file 11. The edit file 11 is an example of the storage area.

Comparison Between Embodiment and Comparative Example

As described above, in the embodiment, not only the item extracted from the keyword included in the search query 10 but also the other item referenced in the description of the extracted item is added and combined into the edit file 11. On the other hand, in a comparative example, it is assumed that only the item extracted from the keyword included in the search query 10 is put into the edit file 11. As in the case of the comparative example, when only the item extracted from the keyword included in the search query 10 is put into the edit file 11, the other item referenced in the description of the extracted item is not included in the edit file 11, and thus it is not possible to refer to the other referenced item in the edit file 11. On the other hand, as in the case of the embodiment, when the other item referenced in the description of the item is also included in the edit file 11, it is possible to refer to the other item referenced item in the edit file 11. Accordingly, it is possible to suppress a broken link to the other item referenced in the description of the extracted item.

Figure 2:
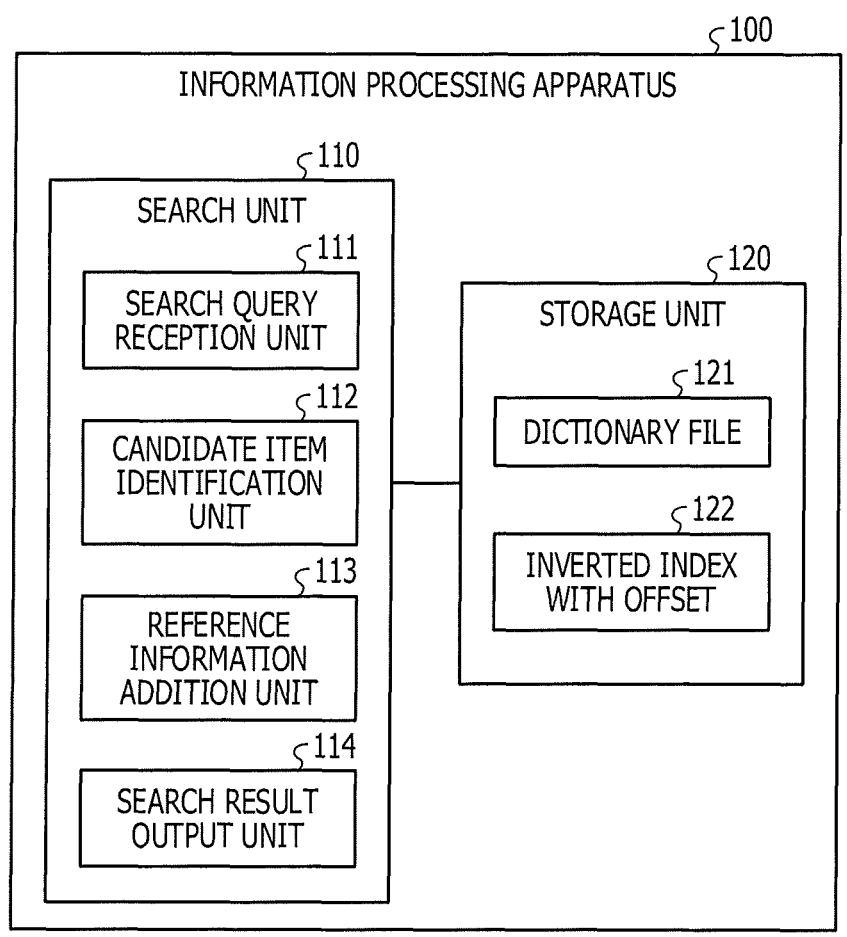
FIG. 2 is a diagram illustrating an example of the system configuration of the search result output processing according to the embodiment.

Configuration of Processing Unit Regarding Search Result Output Processing According to Embodiment A description will be given of the system configuration of the information processing apparatus 100 with reference to FIG. 2. FIG. 2 is a diagram illustrating an example of the system configuration of the search result output processing according to the embodiment. As illustrated in FIG. 2, the information processing apparatus 100 includes a search unit 110 and a storage unit 120, and the search unit 110 is connected to the storage unit 120.

It is possible to realize the functions of the search unit 110, for example, by executing a predetermined program on a central processing unit (CPU). It is possible to realize the function of the search unit 110, for example, by an integrated circuit, such as an application specific integrated circuit (ASIC), a field programmable gate array (FPGA), or the like. The storage unit 120 corresponds to, for example, a semiconductor memory device, such as a random access memory (RAM), a read only memory (ROM), a flash memory, or the like, or a storage device, such as a hard disk, an optical disc, or the like.

As illustrated in FIG. 2, the search unit 110 includes a search query reception unit 111, a candidate item identification unit 112, a reference information addition unit 113, and a search result output unit 114. The storage unit 120 stores a dictionary file 121 and an inverted index with offset 122. The dictionary file 121 is an example of the target data, and the inverted index with offset 122 is an example of the index information. In the following, a detailed description will be given of the configurations of the search unit 110 and the storage unit 120 according to the embodiment.

Each Structure of Storage Unit

Figure 3:
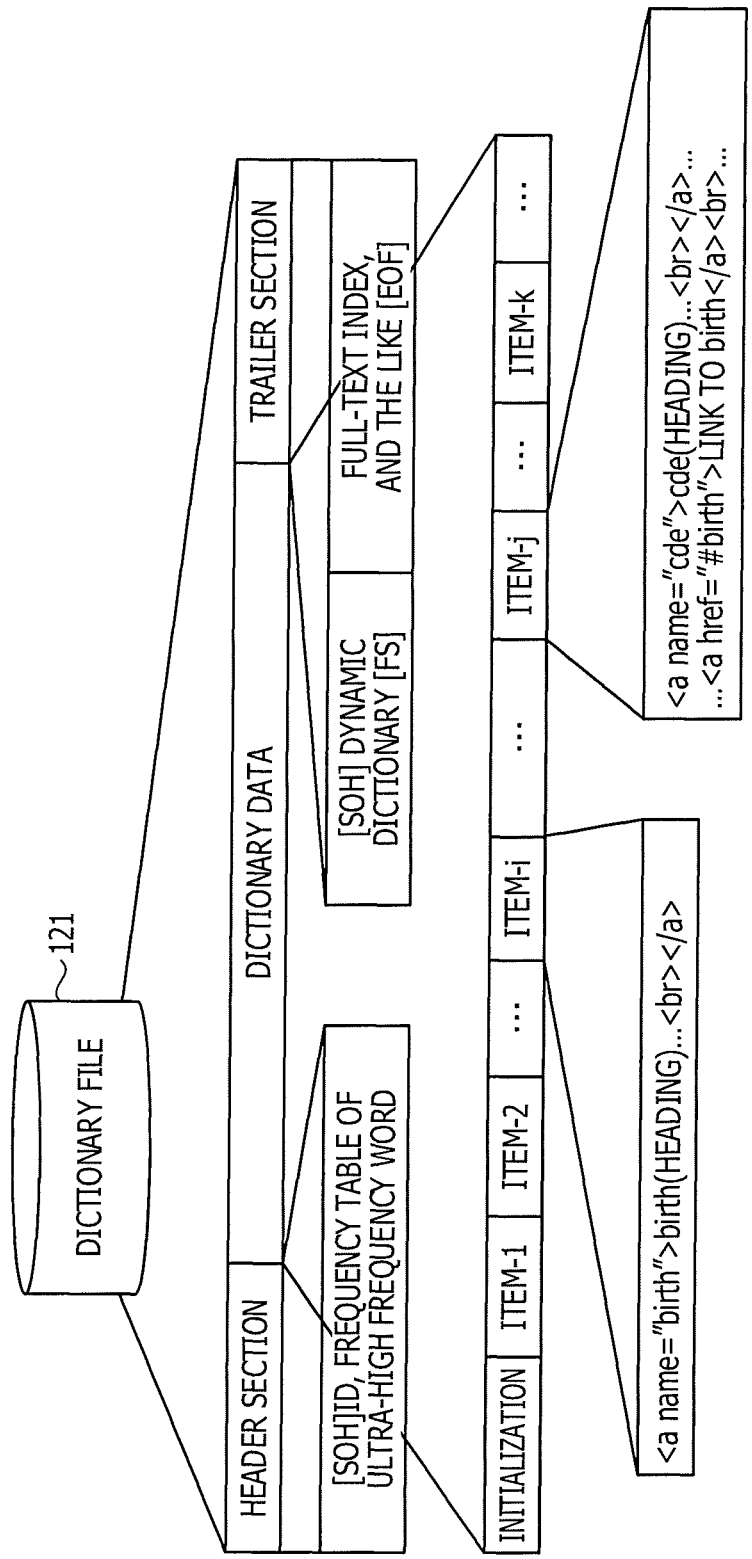
FIG. 3 is a diagram illustrating an example of the structure of a dictionary file according to the embodiment.

First, a description will be given of the dictionary file 121. FIG. 3 is a diagram illustrating an example of the structure of the dictionary file 121 according to the embodiment. As illustrated by the example in FIG. 3, the dictionary file 121 includes a header section, dictionary data, and a trailer section. The header section stores, for example, an ID, a frequency table of ultra-high-frequency word, and the like, but is often omitted. The trailer section stores, for example, a dynamic dictionary, a full-text index, and the like. The dictionary data stores a large number of items as illustrated in FIG. 3. For example, an item-i stores the description of "<a name="birth">birth(heading) . . . <br></a>" and corresponds to the item (birth) described above. The item-j stores the description of "<a name="cde">cde(heading) . . . <br></a> . . . <a href="#birth">link to birth</a><br> . . . " and corresponds to the item(cde) described above. The description of the item-j includes the description indicating a reference to the other item, "<a href="#birth">link to birth</a>".

Figure 4:
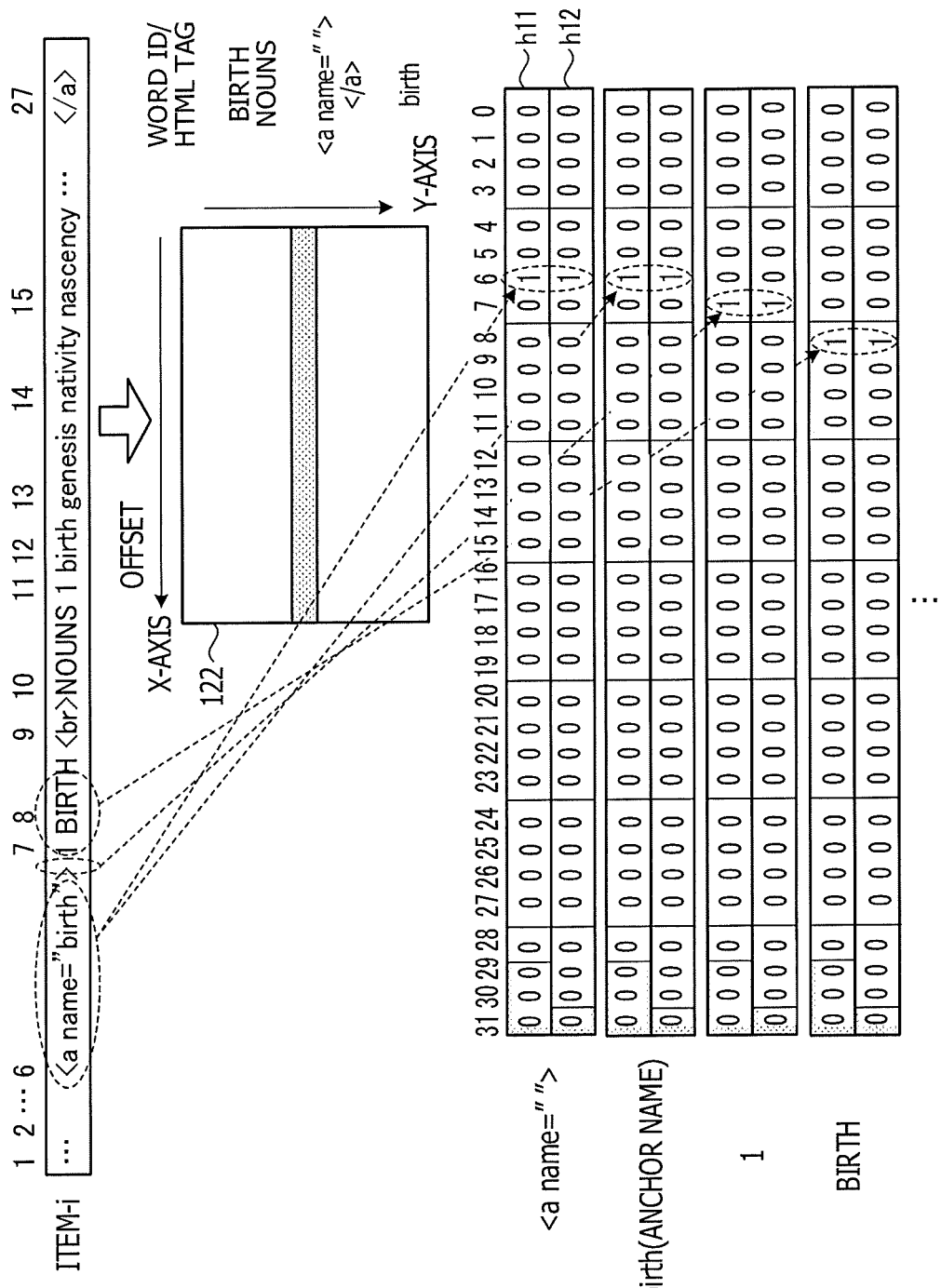
FIG. 4 is a diagram illustrating an example of the structure of an inverted index with offset according to the embodiment.

Next, a description will be given of the inverted index with offset 122. FIG. 4 is a diagram illustrating an example of the structure of the inverted index with offset 122 according to the embodiment. The example in FIG. 4 illustrates the inverted index with offset 122 corresponding to the item i described above. As illustrated in FIG. 4, the item-i stores the description of "<a name="birth">1 BIRTH <br>NOUNS 1 birth genesis nativity nascency . . . </a>".

The information processing apparatus 100 performs lexical analysis on the item-i and obtains "<a name=" ">" "birth(anchor name)" "1" "BIRTH" "<br>" "NOUNS" "birth" "genesis" "nativity" "nascency" "</a>", and the like. Next, the information processing apparatus 100 sets the occurrence position in the item-i of the bitmap corresponding to the obtained HTML tag "<a name=" ">" to a corresponding occurrence bit. The HTML tag "<a name=" ">" appears at the 6-th position of the item-i. Thus, the information processing apparatus 100 sets the sixth-bit occurrence position in the bitmap corresponding to the HTML tag "<a name=" ">" ON, that is to say, sets the sixth-bit to the occurrence bit, which is the binary "1".

The example in FIG. 4 illustrates the hashed inverted index with offset 122. Accordingly, the information processing apparatus 100 generates a plurality of hashed bitmaps to which a hash function is applied for the respective bitmaps corresponding to a word ID and an HTML tag. The information processing apparatus 100 is assumed to have a 32-bit register, and each bitmap is hashed based on hash values (bases) of 29 and 31 as an example. Specifically, the information processing apparatus 100 sets the position indicated by the remainder when each bit position in the bitmap corresponding to a word ID and an HTML tag is divided by the base for each hashed bitmap with one base to each bit value of the bitmap.

As an example, for the hashed bitmap h11 having the base 29, the information processing apparatus 100 sets the position indicated by the remainder when each bit position in the bitmap is divided by the base 29 to each bit value of the bitmap. The bitmap corresponding to the HTML tag "<a name=" ">" is set at the sixth bit of the hashed bitmap h11. For the hashed bitmap h12 having the base 31, the information processing apparatus 100 sets the position indicated by the remainder when each bit position in the bitmap is divided by the base 31 to each bit value of the bitmap. The bitmap corresponding to the HTML tag "<a name=" ">" is set at the sixth bit of the hashed bitmap h12.

In the example in FIG. 4, the information processing apparatus 100 sets the sixth-bit occurrence position in the bitmap corresponding to the case where the anchor name is birth ON, that is to say, sets the sixth-bit to the occurrence bit, which is a binary "1". The information processing apparatus 100 sets the seventh occurrence position in the bitmap corresponding to the word ID "1" ON, that is to say, sets the seventh occurrence position to the occurrence bit, which is the binary "1". The information processing apparatus 100 sets the eighth bit occurrence position in the bitmap corresponding to the word ID "BIRTH" ON, that is to say, sets the eighth occurrence position to the occurrence bit, which is the binary "1". In this manner, the information processing apparatus 100 sets the occurrence bit at the place corresponding to the occurrence position of each word ID and HTML tag.

Each Component of Search Unit

Referring back to FIG. 2, a description will be given of each component of the search unit 110. The search query reception unit 111 receives the search query 10 against the dictionary file 121. For example, the search query reception unit 111 receives a keyword string of a search target as the search query 10. The search query 10 is an example of a search request. The search query reception unit 111 may receive a keyword string including a character and a word mixed as the search query 10.

The candidate item identification unit 112 identifies a file that is included in the dictionary file 121 and that stores an item corresponding to the search query 10 based on the contents of the inverted index with offset 122 and the search query 10. For example, when the search query 10 is a keyword "cde", the candidate item identification unit 112 refers to the inverted index with offset 122 and identifies a file that stores an item-j whose anchor name is "cde".

The reference information addition unit 113 refers to the inverted index with offset 122 and adds information on the other item referenced in the description of the item identified in the candidate item identification unit 112 to the search result. For example, the item-j identified by the candidate item identification unit 112 includes "<a href="#birth">link to birth</a>", which is a description indicating a reference to the other item, and thus the reference information addition unit 113 performs narrowing-down processing on the reference destination based on the description.

Next, a detailed description will be given of the processing for narrowing down a reference destination using the inverted index with offset 122 with reference to FIG. 5. FIG. 5 is a diagram illustrating an example of the narrowing-down processing of a reference destination according to the embodiment. As illustrated by the example in FIG. 5, the reference information addition unit 113 restores the bitmap of the HTML tag "<a name=" ">" where an anchor name is described (refer to FIG. 5(a)). In the example in FIG. 5, the reference information addition unit 113 restores, as the bitmap of the HTML tag "<a name=" ">", the bitmap in which the sixth bit occurrence position is ON, that is to say, the sixth bit has the occurrence bit, which is the binary "1".

Next, the reference information addition unit 113 restores the bitmap corresponding to the case where the anchor name is birth (refer to FIG. 5(b)). In the example in FIG. 5, as the bitmap corresponding to the case where the anchor name is birth, the reference information addition unit 113 restores the bitmap in which the sixth bit occurrence position is ON, that is to say, the sixth bit has the occurrence bit, which is the binary "1".

Next, the reference information addition unit 113 performs AND operation on the restored bitmap so as to perform narrowing down the item having the anchor name of "birth" (refer to FIG. 5(c)). In the example in FIG. 5, AND operation is performs on the bitmap of the HTML tag "<a name=" ">" and the bitmap having the anchor name of birth so that an item having the anchor name of "birth" is narrowed down.

Next, the reference information addition unit 113 restores the bitmap of the HTML tag "</a>" (refer to FIG. 5(d)). In the example in FIG. 5, as the bitmap of the HTML tag "</a>", the reference information addition unit 113 restores the bitmap in which the 27-th occurrence position is ON, that is to say, the 27-th bit has the occurrence bit, which is the binary "1". Finally, the reference information addition unit 113 selects a bitmap nearest to "</a>" (refer to FIG. 5(e)). In the example in FIG. 5, the 27-th occurrence bit is selected as the nearest bitmap among the bitmaps of the HTML tag "</a>". By the processing described so far, the item-i illustrated in FIG. 4 is narrowed down as the reference destination of the item-j.

Referring back to FIG. 2, a description will be given of the remaining components of the search unit 110. The search result output unit 114 outputs a search result. For example, the search result output unit 114 dynamically edits an item corresponding to the keyword "cde", which is the search query 10, and an item referenced in the description of the corresponding item from a large number of items included in the dictionary data in the dictionary file 121.

Figure 6:
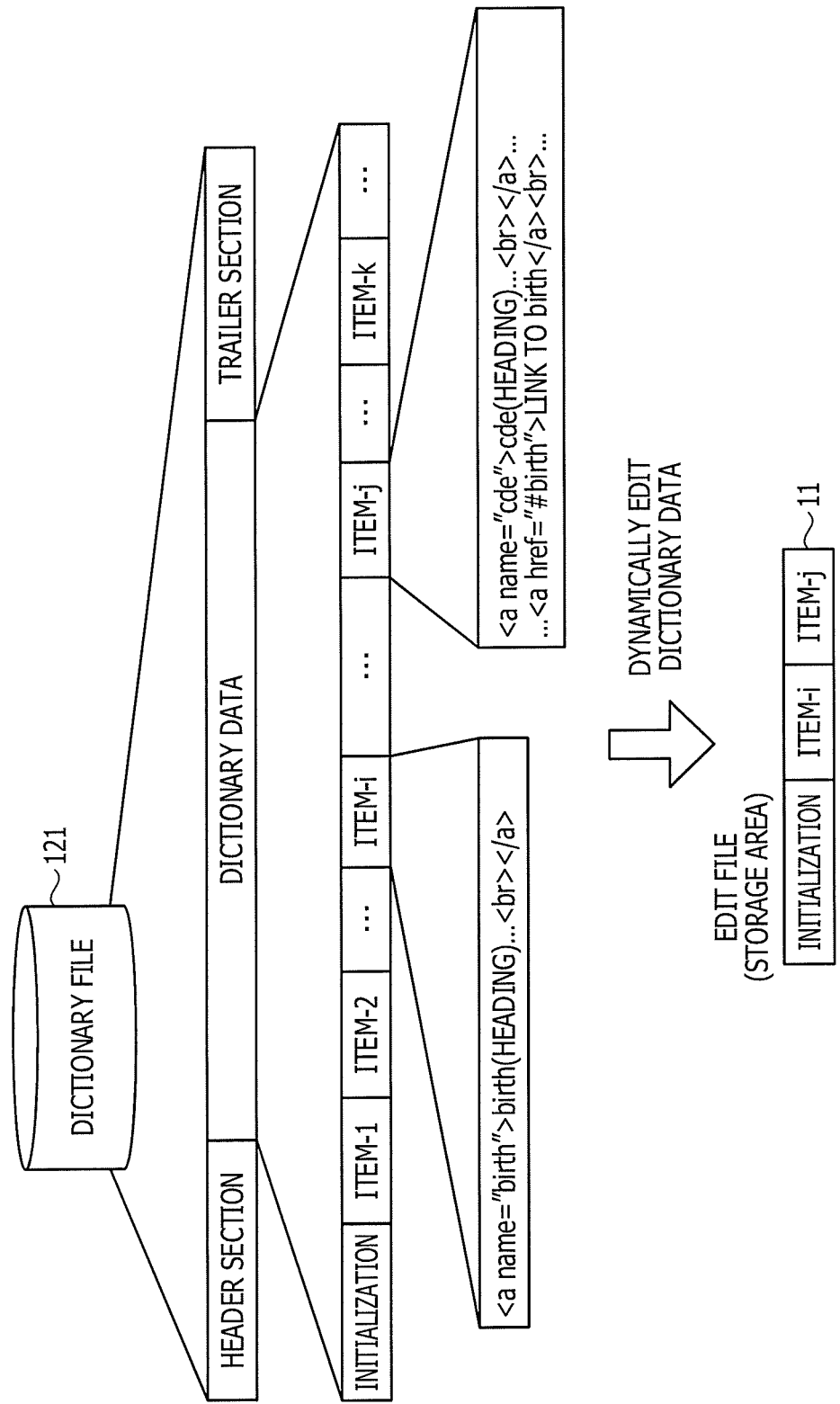
FIG. 6 is a diagram illustrating an example of dynamic edit processing of dictionary data according to the embodiment.

FIG. 6 is a diagram illustrating an example of the dynamic edit processing of the dictionary data according to the embodiment. As illustrated by the example in FIG. 6, the search result output unit 114 creates the edit file 11 in which an item-j corresponding to the keyword "cde", which is the search query 10, and the item-i referenced in the description of the item-j are dynamically edited from a large number of items included in the dictionary data and outputs the edit file 11 as a search result. That is to say, the edit file 11 includes both the item-j corresponding to the keyword "cde" and the item-i referenced in the description of the item-j, and thus is an example of edit data in which the search result from the search query 10 is self-contained inside.

In this manner, by creating the edit file 11 in which items are narrowed down from a large number of items included in the dictionary data in the dictionary file 121, it is possible to browse the search result having a suppressed broken link even with a terminal having a limited capacity. When it is determined that there are no items corresponding to the search query 10 in the dictionary file 121, the search result output unit 114 outputs a statement that there are no search targets as a search result.

Figure 7:
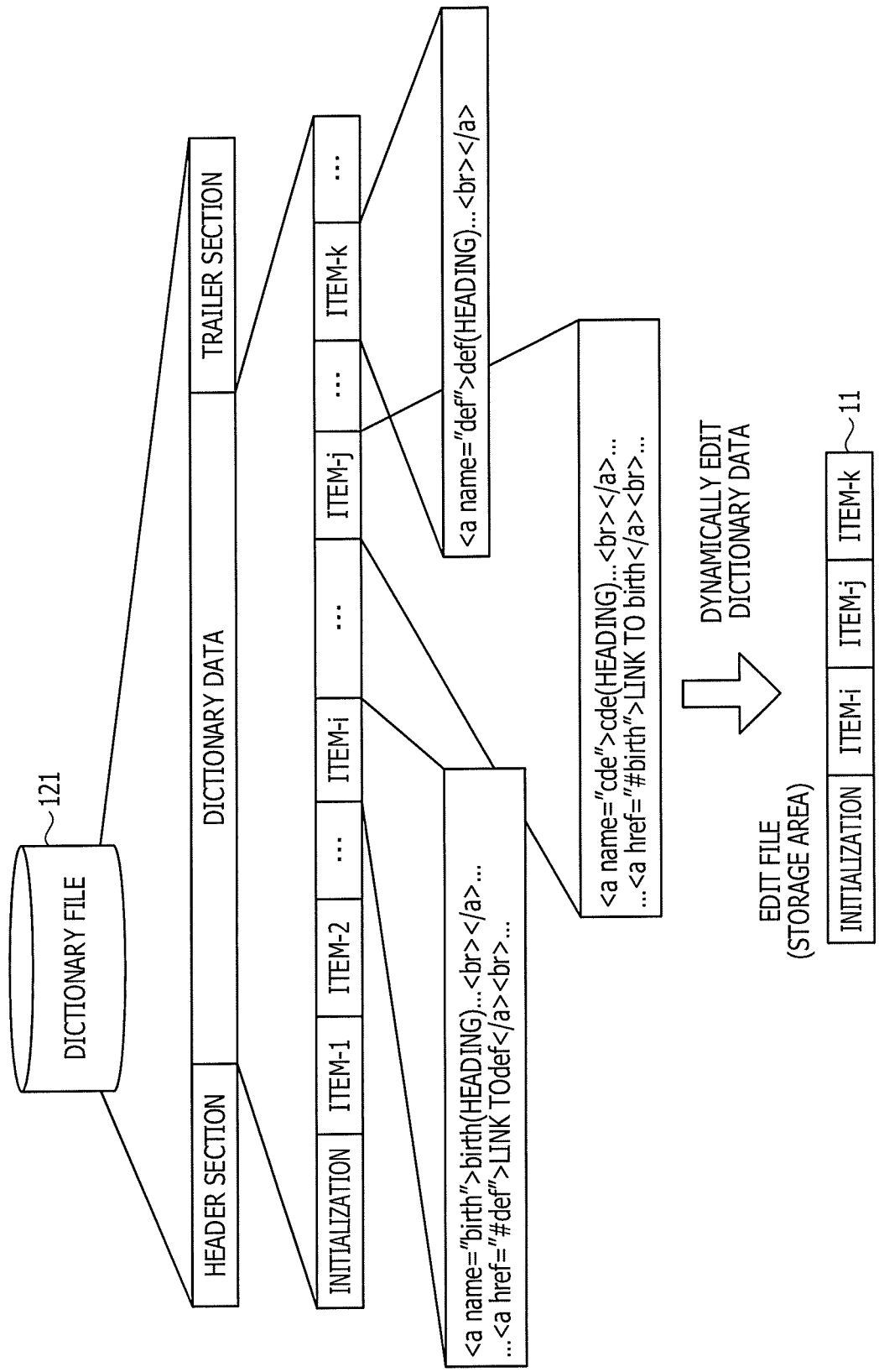
FIG. 7 is a diagram illustrating another example of dynamic edit processing of dictionary data according to the embodiment.

FIG. 7 is a diagram illustrating another example of the dynamic edit processing of the dictionary data according to the embodiment. The example in FIG. 7 illustrates the case where a different item is further referenced in the description of the item-i, which is the reference destination of the item-j. As illustrated by the example in FIG. 7, the item-i includes a description indicating a reference to a different item, "<a href="#def">link to def</a>". In this case, the reference information addition unit 113 performs narrowing-down processing on the reference destination based on the description of "<a href="#def">link to def</a>", which is included in the item-i. By the narrowing-down processing of the reference destination described above, the item-k having an anchor name of "def" is narrowed down as a reference destination of the item-i.

Next, the search result output unit 114 creates, from a large number of items included in the dictionary data, the edit file 11 in which the item-j corresponding to the keyword "cde", which is the search query 10, the item-i referenced in the description of the item-j, and the item k referenced in the description of the item-i are dynamically edited, and outputs the edit file 11 as a search result. Thereby, it is possible to suppress a broken link even if a different item is further referenced in the item that is referenced. When a different item is further referenced in the description of the item k, the same processing ought to be performed.

To date, dictionary content has been divided into a large number of small-sized HTML files due to the relationships, such as the resources of a terminal that displays the dictionary file 121, and the like. Accordingly, if there is a reference to the other item in the description in the dictionary, the reference has a format including a file that stores the other item and a reference to the other item (for example, a format, such as "<a href="file01#id001">reference</a>").

On the other hand, since the restriction due to the limitation of the resources of the terminal is relaxed, the dictionary content is stored in a larger sized file than before. In accordance with this, if there is a reference to the other item in a description in the dictionary, the reference is not limited to the reference to the other file, and there are cases where a reference is included in the same file. Accordingly, if the other item exists in the same file, the description is made in a format that does not include a file name in a reference to the other item (for example, a format such as "<a name="#id001">reference</a>").

When a link included in an item in the search result displayed in response to the search query 10 is referenced, or the like, unlike the case of directly referring to the item, it is not possible to directly follow a reference destination because the file name to be referenced is not included. However, by executing the search result output processing according to the embodiment described above, it is possible to directly follow the reference destination even in such a case.

Processing Flow According to Embodiment

Figure 8:
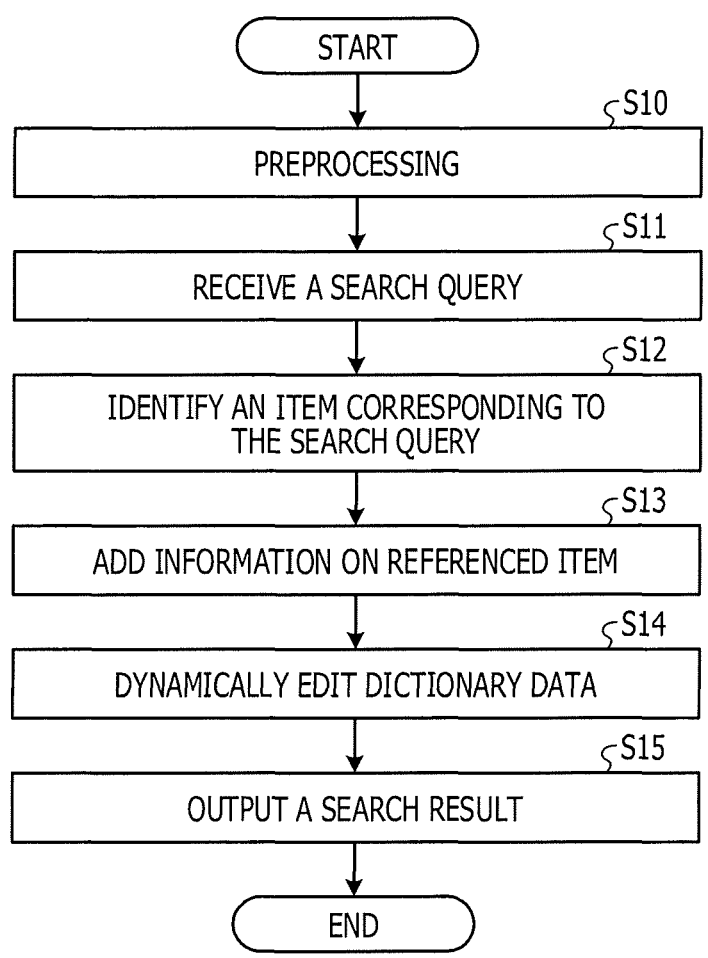
FIG. 8 is a diagram illustrating an example of the flow of the search result output processing.

Next, a description will be given of the flow of the search result output processing according to the embodiment. FIG. 8 is a diagram illustrating an example of the flow of the search result output processing according to the embodiment. As illustrated by the example in FIG. 8, the information processing apparatus 100 first performs preprocessing (step S10). For example, the information processing apparatus 100 reserves a storage area for holding the dictionary file 121 in the preprocessing and a storage area for holding the inverted index with offset 122. Next, the search query reception unit 111 receives a search query 10 (step S11). Next, the candidate item identification unit 112 refers to the inverted index with offset 122 and identifies an item corresponding to the search query 10 (step S12). Next, the reference information addition unit 113 adds information on the item referenced in the description of the item identified in the candidate item identification unit 112 to the search result (step S13).

Next, the search result output unit 114 dynamically edits the dictionary data in the dictionary file 121 (step S14). For example, the search result output unit 114 dynamically edits an item corresponding to the search query 10 and an item referenced in the description of the item so as to combine the items from the dictionary data. Next, the search result output unit 114 outputs the dynamically edited edit file 11 as a search result (step S15), and the processing is terminated.

Advantages

The search unit 110 receives the search query 10 against the target data (dictionary file 121). The search unit 110 refers to the index information (the inverted index with offset 122) associated with the position of an item for each of a plurality of items included in the target data (dictionary file 121) and identifies a storage area in which an item corresponding to the keyword included in the search query 10. When a reference to the other item is included in the description included in the corresponding item, the search unit 110 refers to the index information (inverted index with offset 122) and adds information on the storage area in which the other item is stored to the reference to the other item. Thereby, when creating the edit file 11 in which storage areas storing the items extracted from the search query 10 are combined, it is possible to suppress a broken link to the other item referenced in the description of the extracted item.

The search unit 110 combines the storage area storing the item corresponding to the keyword included in the search query 10 and the storage area storing the other item and outputs the edit data (edit file 11) having the self-contained search result for the search query 10. Thereby, it is possible to browse the search result in which a broken link is suppressed even by a terminal having a limited capacity.

The storage area that stores the item corresponding to the keyword and the storage area that stores the other item are divided for each file. Thereby, it is possible to display the dictionary file 121 even if there is a restriction on the resources of a terminal that displays the dictionary file 121.

If the description included in the other item further includes a reference to a different item, the search unit 110 refers to the index information (the inverted index with offset 122) and adds information on the storage area storing the different item to the reference to the different item. Thereby, it is possible to suppress a broken link even if the description of an item referenced further includes a different item referenced.

The Other Mode Related to Embodiment

In the following, a description will be given of a part of variations of the embodiment described above. It is possible to make design changes in addition to the variation described below without departing from the spirit and scope of the present disclosure.

For example, in the above-described embodiment, the example in which a search target is the dictionary file 121 that stores dictionary content has been described. However, a search target is not limited to dictionary content and may be any target data that includes a plurality of items.

In the embodiment described above, the description of one item includes the other one item that is referenced. However, the description of one item may include a plurality of the other items that are referenced. In this case, dynamic editing ought to be performed such that all of the plurality of items are included in the edit file 11.

In the embodiment described above, the example in which the description of each item included in the dictionary file 121 is not encoded. However, the description of each item may be encoded and stored in the dictionary file 121.

Further, it is possible to change the processing procedure illustrated in the embodiment, the control procedure, the specific name, and information including various kinds of data, parameters unless otherwise specified.

Hardware Configuration of Information Processing Apparatus

Figure 9:
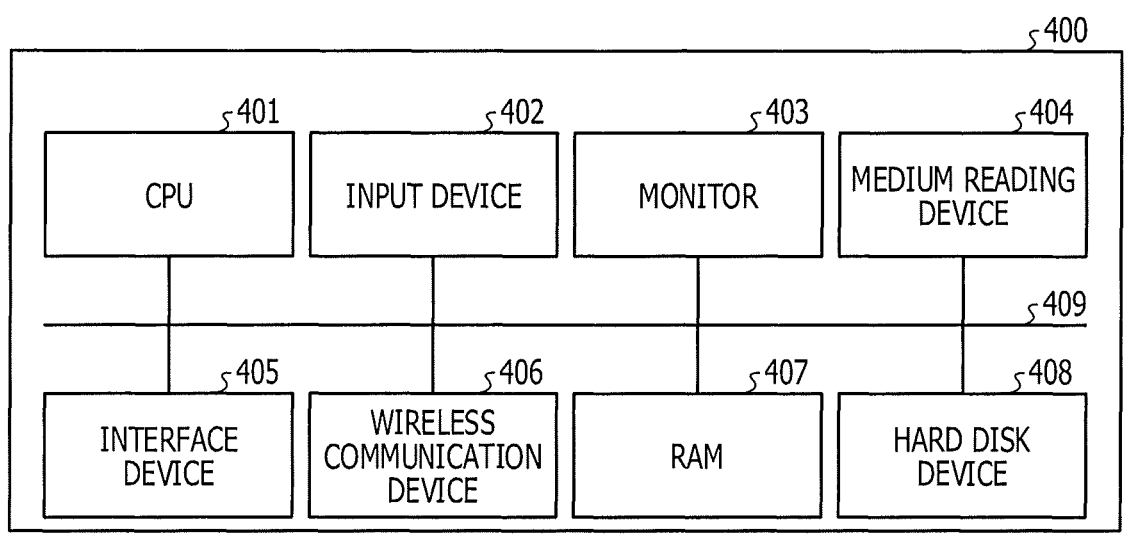
FIG. 9 is a diagram illustrating the hardware configuration of an information processing apparatus according to the embodiment.

FIG. 9 is a diagram illustrating the hardware configuration of the information processing apparatus 100 according to the embodiment. As illustrated in the example in FIG. 9, a computer 400 includes a CPU 401 that performs various operation processing, an input device 402 that receives input of data from a user, and a monitor 403. The computer 400 includes a medium reading device 404 that reads a program, and the like from a storage medium, an interface device 405 for connecting with the other device, and a wireless communication apparatus 406 for wirelessly connecting to the other device. The computer 400 includes a RAM 407 that temporarily stores various kinds of information and a hard disk device 408. Each of the devices 401 to 408 is connected to a bus 409.

The hard disk device 408 stores information processing programs having the same functions as those of the respective processing units, for example, the search query reception unit 111, the candidate item identification unit 112, the reference information addition unit 113, and the search result output unit 114. The hard disk device 408 stores various kinds of data for realizing the information processing programs.

The CPU 401 performs various kinds of processing by reading each of the programs stored in the hard disk device 408, loads the program into the RAM 407, and executing the program. The programs are capable of causing the computer 400 to function, for example, as the search query reception unit 111, the candidate item identification unit 112, the reference information addition unit 113, and the search result output unit 114 that are illustrated in FIG. 2.

The information processing programs do not have to be stored in the hard disk device 408. For example, the computer 400 may read the program that is stored in a storage medium readable by the computer 400 and may execute the program. The storage medium readable by the computer 400 corresponds to a portable recording medium, for example, a CD-ROM, a DVD disc, a Universal Serial Bus (USB) memory, or the like, a semiconductor memory, such as a flash memory, or the like, a hard disk drive, or the like. The program may be stored in a device connected to a public line, the Internet, a local area network (LAN), or the like, and the computer 400 may read the program from the device and may execute the program.

Figure 10:
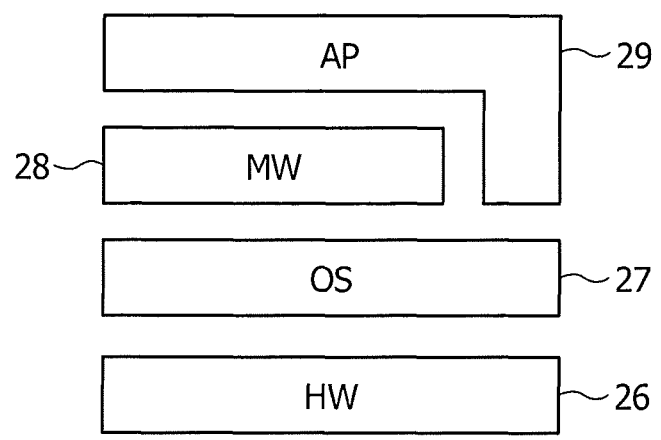
FIG. 10 is a diagram illustrating an example of the configuration of a program executed on a computer.

FIG. 10 is a diagram illustrating an example of the configuration of a program executed on the computer 400. An operating system (OS) 27 that controls a hardware group 26 (401 to 409) illustrated in FIG. 9 runs on the computer 400. The CPU 401 operates in a procedure in accordance with the OS 27 to control and manage the hardware group 26 so that the processing in accordance with an application program 29 and a middleware 28 is performed on the hardware group 26. In the computer 400, the middleware 28 or the application program 29 is read into the RAM 407 and executed by the CPU 401.

When a search function is invoked by the CPU 401, the function of the search unit 110 is realized by performing the processing based on at least a part of the middleware 28 or the application program 29 (performing the processing by controlling the hardware group 26 based on the OS 27). Each search function may be included in the application program 29 by itself, or may be a part of the middleware 28 that is called in accordance with the application program 29.

Figure 11:
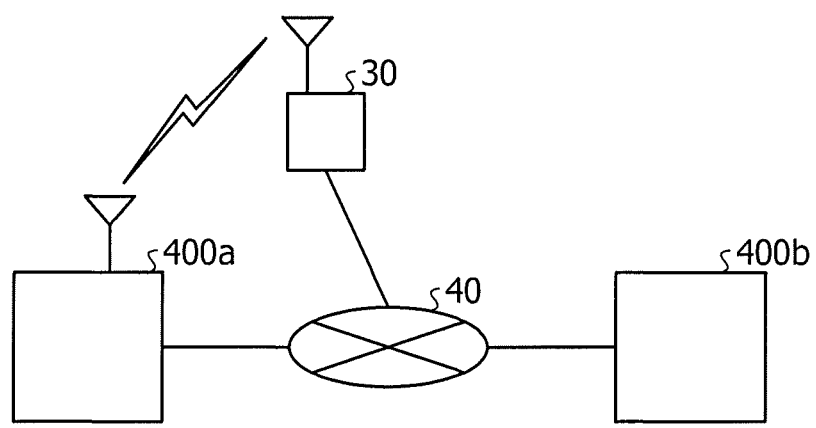
FIG. 11 is a diagram illustrating an example of the configuration of a device in a system according to the embodiment.

FIG. 11 is a diagram illustrating an example of the configuration of a device in a system according to the embodiment. The system in FIG. 11 includes a computer 400*a*, a computer 400*b*, a base station 30, and a network 40. The computer 400*a* is connected either wirelessly or wiredly, or in the both way to a network 40 to which the computer 400*b* is connected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for outputting a search result, the method comprising:
   executing a reception process that includes receiving a search query for target data;
   executing a candidate item identification process that includes referring to index information associating each of a plurality of items included in the target data with a position of a corresponding one of the items, and identifying a first storage area configured to store an item corresponding to a keyword included in the search query as a candidate item; and
   executing an addition process that includes, when a description included in the corresponding one of the items includes a reference to a different item in the target data, referring to the index information and adding information on a second storage area configured to store the different item to the reference to the different item in the target data to the candidate item, wherein each of the first storage area and the second storage area indicates a partial area within the target data, wherein
   the first storage area storing the item corresponding to the keyword and the second storage area storing the different item are divided into units of files, and
   on condition that the item and the different item are in a same file, the description is in a format that does not include a file name in a reference to the different item.

2. The method according to claim 1, further comprising:
   executing an output process that includes combining the first storage area storing the item corresponding to the keyword included in the search query and the second storage area storing the different item, and outputting self-contained edit data of a search result from the search query.

3. The method according to claim 1, further comprising:
   executing a second addition process that includes when the description included in the different item further includes a reference to a further different item in the target data, referring to the index information and adding information on a third storage area storing the further different item in the target data to the reference to the further different item.

4. An apparatus for outputting a search result, the apparatus comprising:
   a memory; and
   processor circuitry coupled to the memory and configured to
   execute a reception process that includes receiving a search query for target data;
   execute a candidate item identification process that includes referring to index information associating each of a plurality of items included in the target data with a position of a corresponding one of the items, and identifying a first storage area configured to store an item corresponding to a keyword included in the search query as a candidate item; and
   execute an addition process that includes, when a description included in the corresponding one of the items includes a reference to a different item in the target data, referring to the index information and adding information on a second storage area configured to store the different item in the target data to the reference to the different item to the candidate item, wherein each of the first storage area and the second storage area indicates a partial area within the target data, wherein the first storage area storing the item corresponding to the keyword and the second storage area storing the different item are divided into units of files, and on condition that the item and the different item are in a same file, the description is in a format that does not include a file name in a reference to the different item.

5. The apparatus according to claim 4, wherein the processor circuitry is further configured to execute an output process that includes combining the first storage area storing the item corresponding to the keyword included in the search query and the second storage area storing the different item, and outputting self-contained edit data of a search result from the search query.

6. The apparatus according to claim 4, wherein the processor circuitry is further configured to execute a second addition process that includes, when the description included in the different item further includes a reference to a further different item in the target data, referring to the index information and adding information on a third storage area storing the further different item in the target data to the reference to the further different item to the candidate item.

7. A non-transitory computer-readable storage medium for storing a program which causes a processor to perform processing for outputting a search result, the processing comprising:

executing a reception process that includes receiving a search query for target data;

executing a candidate item identification process that includes referring to index information associating each of a plurality of items included in the target data with a position of a corresponding one of the items, and identifying a first storage area configured to store an item corresponding to a keyword included in the search query as a candidate item; and executing an addition process that includes, when a description included in the corresponding one of the items includes a reference to a different item in the target data, referring to the index information and adding information on a second storage area configured to store the different item in the target data to the reference to the different item to the candidate item, wherein each of the first storage area and the second storage area indicates a partial area within the target data, wherein the first storage area storing the item corresponding to the keyword and the second storage area storing the different item are divided into units of files, and on condition that the item and the different item are in a same file, the description is in a format that does not include a file name in a reference to the different item.

8. The non-transitory computer-readable storage medium according to claim 7, further comprising:

executing an output process that includes combining the first storage area storing the item corresponding to the keyword included in the search query and the second storage area storing the different item, and outputting self-contained edit data of a search result from the search query.

9. The non-transitory computer-readable storage medium according to claim 7, further comprising:

executing a second addition process that includes, when the description included in the different item further includes a reference to a further different item in the target data, referring to the index information and adding information on a third storage area storing the further different item in the target data to the reference to the further different item to the candidate item.

\* \* \* \* \*